United States Patent
Martinovic

(10) Patent No.: US 12,244,193 B2
(45) Date of Patent: Mar. 4, 2025

(54) STATOR OF AN ELECTRIC MACHINE

(71) Applicant: Robert Bosch GmbH, Stuttgart (DE)

(72) Inventor: Drazen Martinovic, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 17/923,011

(22) PCT Filed: Apr. 27, 2021

(86) PCT No.: PCT/EP2021/060933
§ 371 (c)(1),
(2) Date: Nov. 3, 2022

(87) PCT Pub. No.: WO2021/224059
PCT Pub. Date: Nov. 11, 2021

(65) Prior Publication Data
US 2023/0179053 A1  Jun. 8, 2023

(30) Foreign Application Priority Data

May 6, 2020 (DE) ..................... 10 2020 205 684.6

(51) Int. Cl.
*H02K 3/00* (2006.01)
*H02K 3/28* (2006.01)

(52) U.S. Cl.
CPC ..................... *H02K 3/28* (2013.01)

(58) Field of Classification Search
CPC .. H02K 3/03; H02K 3/38; H02K 3/04; H02K 3/12; H02K 3/14; H02K 3/52; H02K 3/28; H02K 3/00; H02K 3/46; H02K 3/50

(Continued)

(56) References Cited

U.S. PATENT DOCUMENTS 3,710,437 A * 1/1973 Kipple .................. H02K 15/12
29/598
4,616,407 A * 10/1986 Tamaki .................. H02K 15/12
29/598

(Continued)

FOREIGN PATENT DOCUMENTS

DE   102017218078   4/2019

OTHER PUBLICATIONS

Translation of International Search Report for Application No. PCT/EP2021/060933 dated Jul. 21, 2021 (2 pages).

*Primary Examiner* — Maged M Almawri
(74) *Attorney, Agent, or Firm* — Michael Best & Friedrich LLP

(57) ABSTRACT

A stator of an electric machine having stator slots and conductor elements running through the stator slots in order to form an electric winding is already known, wherein the conductor elements protrude with their conductor ends out from the stator slots and form a winding head at each of the two end faces of the stator, the conductor ends of the conductor elements each having a cabinet portion running in the circumferential direction and a joining portion for contacting another of the conductor elements, each of the joining portions arranged adjacently to one another of two conductor elements being joined, for example welded, by means of a joint and in each case forming a conductor pair, the conductor pairs being arranged in the winding head in a specific radial winding head position in relation to a stator axis. The strength of the joints in the stator according to the invention is dependent on the mechanical connection of each conductor pair to the corresponding winding head. In accordance with the invention, conductor pairs (11) are provided in the winding head (6), the joint (10) of which conductor pairs has a greater strength, in particular a greater weld depth (Continued)

(14), greater seam width or a greater seam cross section (15), than the joint (10) of the other conductor pairs (11).

14 Claims, 2 Drawing Sheets

(58) Field of Classification Search
USPC .................................................. 310/179–208
See application file for complete search history.

(56) References Cited

U.S. PATENT DOCUMENTS

| | | | | |
|---|---|---|---|---|
| 6,181,043 B1* | 1/2001 | Kusase | ................... | H02K 3/50 |
| | | | | 310/201 |
| 6,388,358 B1* | 5/2002 | Umeda | ................... | H02K 3/12 |
| | | | | 310/179 |
| 6,459,177 B1* | 10/2002 | Nakamura | ......... | H02K 15/0056 |
| | | | | 310/201 |
| 6,903,478 B2* | 6/2005 | Dobashi | ............... | H02K 15/064 |
| | | | | 310/179 |
| 6,915,556 B2* | 7/2005 | Lenoir | ............... | H02K 15/0081 |
| | | | | 29/598 |
| 7,042,129 B2* | 5/2006 | Neet | ...................... | H02K 1/165 |
| | | | | 310/208 |
| 7,287,311 B2* | 10/2007 | Ichikawa | ................. | H02K 3/12 |
| | | | | 29/598 |
| 7,564,159 B2* | 7/2009 | Ooiwa | ................... | H02K 3/505 |
| | | | | 310/201 |
| 8,436,506 B2* | 5/2013 | Wang | ...................... | H02K 3/12 |
| | | | | 228/115 |
| 8,604,655 B1* | 12/2013 | Ferran | ...................... | H02K 3/28 |
| | | | | 310/179 |
| 8,659,202 B2* | 2/2014 | Ikeda | ...................... | H02K 3/12 |
| | | | | 310/179 |
| 8,772,995 B2* | 7/2014 | Ogihara | ............. | H02K 15/0081 |
| | | | | 310/201 |
| 8,878,413 B2* | 11/2014 | Wolf | ...................... | H02K 3/28 |
| | | | | 310/58 |
| 8,987,969 B2* | 3/2015 | Kamatani | .......... | H02K 15/0068 |
| | | | | 310/201 |
| 9,419,484 B2* | 8/2016 | Tokizawa | ............... | H02K 15/04 |
| 9,496,773 B2* | 11/2016 | Ishigami | ............... | B60L 15/007 |
| 9,559,573 B2* | 1/2017 | Baba | ................... | H02K 15/105 |
| 9,647,502 B2* | 5/2017 | Takahashi | ................ | H02K 9/19 |
| 10,063,117 B2* | 8/2018 | Nakayama | ......... | H02K 15/0081 |
| 10,128,728 B2* | 11/2018 | Hirao | ...................... | H02K 3/14 |
| 10,389,199 B2* | 8/2019 | Langlard | ................... | H02K 3/12 |
| 11,557,931 B2* | 1/2023 | Nishikuma | ........ | H02K 15/0056 |
| 2001/0011852 A1* | 8/2001 | Nakamura | ............... | H02K 3/34 |
| | | | | 310/201 |
| 2002/0033649 A1* | 3/2002 | Oohashi | ................... | H02K 3/28 |
| | | | | 310/201 |
| 2002/0053126 A1* | 5/2002 | Maeda | ............... | H02K 15/0414 |
| | | | | 29/596 |
| 2003/0135980 A1* | 7/2003 | Ichikawa | ........... | H02K 15/0081 |
| | | | | 29/598 |
| 2006/0232157 A1* | 10/2006 | Ooiwa | ............... | H02K 15/0081 |
| | | | | 310/260 |
| 2006/0267440 A1* | 11/2006 | Sakai | ....................... | H02K 3/12 |
| | | | | 310/184 |
| 2008/0191574 A1* | 8/2008 | Tokizawa | ........... | H02K 15/0081 |
| | | | | 310/179 |
| 2008/0246354 A1* | 10/2008 | Asao | ...................... | H02K 15/12 |
| | | | | 310/45 |
| 2011/0036614 A1* | 2/2011 | Otsuka | ...................... | C22C 21/00 |
| | | | | 156/50 |
| 2011/0181143 A1* | 7/2011 | Hasegawa | ................ | H02K 3/38 |
| | | | | 310/180 |
| 2014/0069686 A1* | 3/2014 | Abe | ...................... | H01B 7/0275 |
| | | | | 521/88 |
| 2014/0225465 A1* | 8/2014 | Goto | ........................ | H02K 3/28 |
| | | | | 310/71 |
| 2015/0188371 A1* | 7/2015 | Kato | ................... | H02K 15/045 |
| | | | | 310/208 |
| 2015/0311757 A1* | 10/2015 | Tamura | .................. | H02K 15/04 |
| | | | | 29/596 |
| 2017/0264155 A1* | 9/2017 | Nakayama | ............... | H02K 3/12 |
| 2018/0323672 A1* | 11/2018 | Juris | ........................ | H02K 3/18 |
| 2019/0207439 A1* | 7/2019 | Marino | .................... | H02K 1/20 |
| 2022/0271596 A1* | 8/2022 | Takahashi | ................ | H02K 3/04 |
| 2022/0399786 A1* | 12/2022 | Graef | ........................ | H02K 9/197 |
| 2023/0008528 A1* | 1/2023 | Tonino | .................. | H02K 15/12 |
| 2023/0112188 A1* | 4/2023 | Sawata | ...................... | H02K 3/24 |
| | | | | 310/65 |

\* cited by examiner

STATOR OF AN ELECTRIC MACHINE

BACKGROUND OF THE INVENTION

The invention proceeds from a stator of an electric machine.

A stator of an electric machine is known from DE 10 2017 218 078 A1 which comprises stator slots and comprises conductor elements which extend through the stator slots to form an electrical winding, wherein the conductor elements project with their conductor ends from the stator slots and form a winding head on each of the two end faces of the stator, wherein the conductor ends of the conductor elements each comprise a skewed portion which extends in peripheral direction and a joining portion for contacting another of the conductor elements, wherein respective abutting joining portions of two conductor elements are joined, for example welded, by means of a joining connection and respectively form a conductor pair, wherein the conductor pairs lie in the winding head in a specific radial winding head position with respect to a stator axis which includes a winding head outer position, a winding head inner position and intermediate winding head intermediate positions. A conductor pair, which is disposed in the winding head outer position or in the winding head inner position and in which none of the skewed portions are crossed with one of the skewed portions of other conductor pairs to form an interlacing, forms a free-standing conductor pair. A conductor pair, which is disposed in the winding head outer position or in the winding head inner position and in which only one of the two skewed portions is crossed with one of the skewed portions of other conductor pairs with mutual contact or support to form an interlacing, further forms a one side-connected conductor pair. The interlacing is provided with mutual contact or support at a specific interlacing height relative to an end face of the stator. A conductor pair, which is disposed in the winding head outer position or in the winding head inner position and the skewed portions of which are crossed without contact to form an interlacing, furthermore forms a contactlessly interlaced conductor pair. During operation of the electric machine, the individual joining connections of the conductor pairs of one of the winding heads are subjected to varying amounts of mechanical vibrations; specifically depending on the mechanical connection of the respective conductor pair to the respective winding head.

SUMMARY OF THE INVENTION

Compared to this, the stator according to the invention has the advantage that the strength of the joining connections is implemented depending on the mechanical connection of the respective conductor pair to the respective winding head. The load-dependent design of the joining connections makes it possible to significantly reduce the overall process time required to manufacture the joining connections, thus decreasing the manufacturing costs for the stator. According to the invention, this is achieved by providing conductor pairs in the winding head, the joining connection of which has greater strength, in particular a greater weld depth, greater weld seam width or a greater weld seam cross-section than the joining connection of the other conductor pairs. Mechanical oversizing of the joining connections of the other conductor pairs is avoided.

Advantageous further developments and improvements of the stator are possible as a result of the measures listed in the subclaims.

It is particularly advantageous if the one side-connected conductor pairs, in which a ratio of the interlacing height to the height of the winding head is configured to be less than 0.5, and/or all free-standing conductor pairs and/or all contactlessly interlaced conductor pairs each comprise a joining connection having greater strength. The other conductor pairs therefore comprise joining connections having lesser strength. Thus, mechanical oversizing of the joining connections of the other conductor pairs is avoided.

According to one advantageous design, the weld seam cross-section of the joining connections having the lesser strength is 30% to 50% smaller than the weld seam cross-section of the joining connections having the greater strength.

According to the design example, one of the two winding heads is symmetrical and the other of the two winding heads is asymmetrical, wherein the joining connections having greater strength are provided in the asymmetrical winding head.

BRIEF DESCRIPTION OF THE DRAWINGS

One design example of the invention is shown in simplified form in the drawings and explained in more detail in the following description.

DETAILED DESCRIPTION

Figure 1:
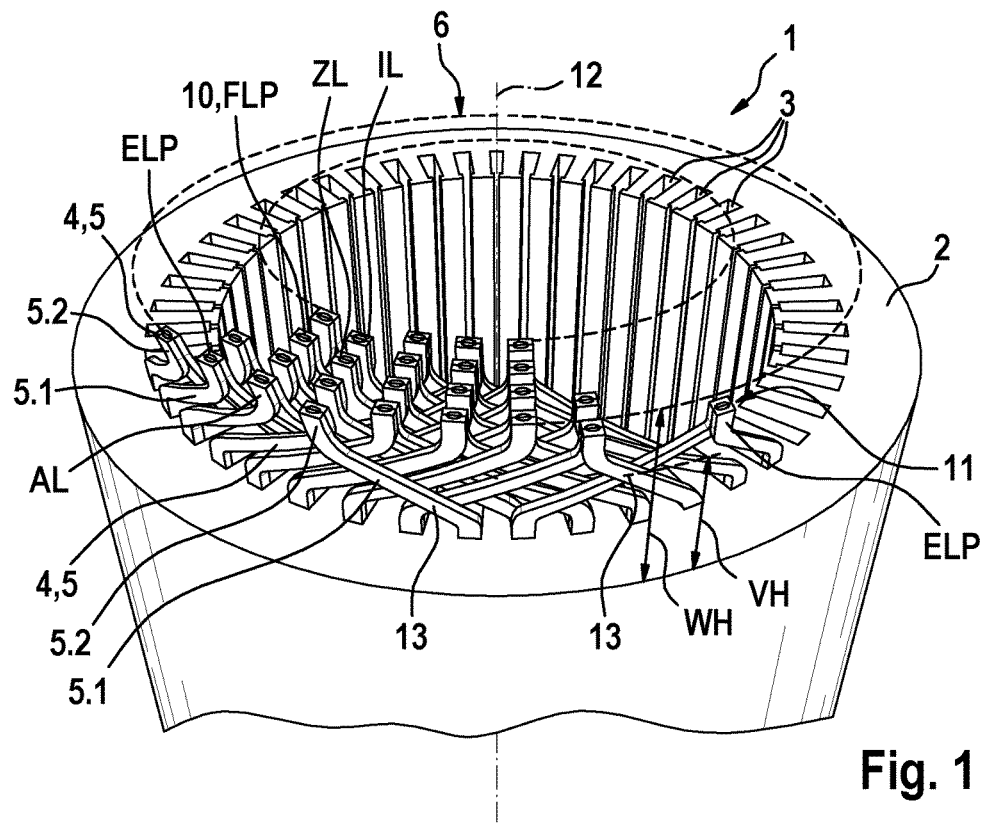
FIG. 1 shows a view of a stator comprising an electrical plug-in winding in which the invention can be used, FIG. 2 a side view of an interlacing of two conductor elements of FIG. 1, FIG. 3 a plan view onto an interlacing of two conductor elements of FIG. 1, FIG. 4 a sectional view of a joining connection having greater strength for a conductor pair of FIG. 1, and FIG. 5 a sectional view of a joining connection having lesser strength for a conductor pair of FIG. 1.

FIG. 1 shows a view of a stator comprising an electrical plug-in winding in which the invention can be used.

The stator 1 of an electric machine includes a stator body 2 comprising stator slots 3 and conductor elements 4 which extend through the stator slots 3 of the stator body 2 to form an electrical plug-in winding. The stator body 2 is a laminated stator core, for example.

The conductor elements 4, which are configured as a so-called I-pin, for example, project with their conductor ends 5 from the stator slots 3 and form a winding head 6 on each of the two end faces of the stator 1. The conductor elements 4 can alternatively also be implemented as a so-called hairpin. To simplify the illustration, only a part of the conductor elements 4 is shown in FIG. 1. The other part of the winding head 6 is outlined with dashed lines.

The conductor ends 5 of the conductor elements 4 each comprise a skewed portion 5.1 which extends in peripheral direction and a joining portion 5.2 for contacting another of the conductor elements 4.

In the winding head 6, respective abutting joining portions 5.2 of two conductor elements 4 are joined, for example welded, by means of a joining connection 10 and respectively form a conductor pair 11.

The conductor pairs 11 are disposed in the respective winding head 6 in a specific radial winding head position with respect to a stator axis 12. The radial winding head position includes a winding head outer position AL, a winding head inner position IL and intermediate winding head intermediate positions ZL, wherein the winding head outer position AL is a respective radially outermost position and the winding head inner position IL is a respective radially innermost position of conductor pairs 11.

The specific conductor pairs of the winding head 6 are defined in the following in order to explain the invention:

A conductor pair 11, which is disposed in the winding head outer position AL or in the winding head inner position IL and in which only one of the two skewed portions 5.1 is crossed with one of the skewed portions 5.1 of other conductor pairs 11 with mutual contact or support to form an interlacing 13, forms a one side-connected conductor pair.

Figure 2:
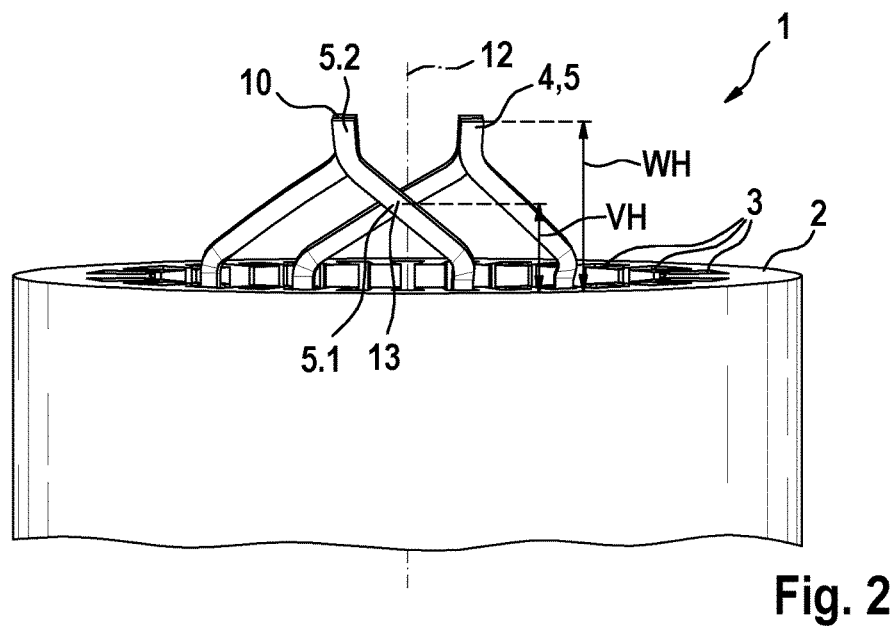
Figure 3:
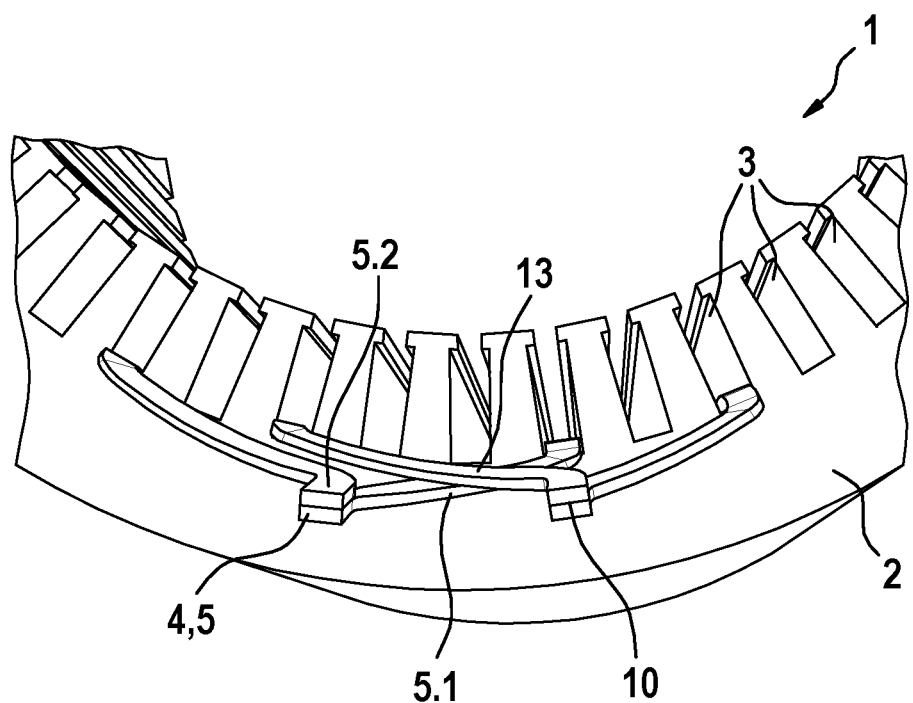

In this application, an interlacing 13 is to be understood to mean a crossing of the skewed portions 5.1, which provides a mechanical support or connection of the respective conductor ends 4 to other conductor ends 4 of the respective winding head 6 and thus prevents, or at least reduces, a vibration of the conductor ends 4. The interlacing 13 with mutual contact or support has a specific interlacing height VH relative to an end face of the stator 1, which is to be measured in the axial direction with respect to the stator axis 12. FIG. 2 and FIG. 3 show examples of two conductor pairs 11 which are disposed in the winding head outer position AL and form a supporting interlacing within the meaning of the invention.

A conductor pair 11, which is disposed in the winding head outer position AL or in the winding head inner position IL and in which none of the skewed portions 5.1 are crossed with one of the skewed portions 5.1 of other conductor pairs 11 to form an interlacing, forms a free-standing conductor pair. Such a free-standing conductor pair FLP is not interlaced with other conductor elements 4 of the winding head 6 in the respective winding head 6 and is therefore not mechanically supported by other conductor elements 4 of the respective winding head 6. As a result, particularly high vibration forces or vibration loads act on the joining connections 10 of the free-standing conductor elements FLP.

A conductor pair 11, which is disposed in the winding head outer position AL or in the winding head inner position IL and the skewed portions 5.1 of which are crossed without contact to form an interlacing 13, forms a contactlessly interlaced conductor pair which is to be regarded as a free-standing conductor pair FLP.

According to the invention, it is provided that specific conductor pairs 11 be provided in the respective winding head 6, the joining connection 10 of which has greater strength, for example a greater weld depth, greater weld seam width or a greater weld seam cross-section or weld seam cross-sectional area 15 than the joining connection 10 of the other conductor pairs 11.

These specific conductor pairs 11 having greater strength are the one side-connected conductor pairs ELP, for example, in which a ratio of the interlacing height VH to the height of the winding head WH is less than 0.5, and/or all free-standing conductor pairs FLP and/or all contactlessly interlaced conductor pairs FLP.

One of the two winding heads 6 is symmetrical, for example, and the other of the two winding heads 6 is asymmetrical, wherein the joining connections having greater strength are provided in the asymmetrical winding head 6, for example.

Figures 4, 5:
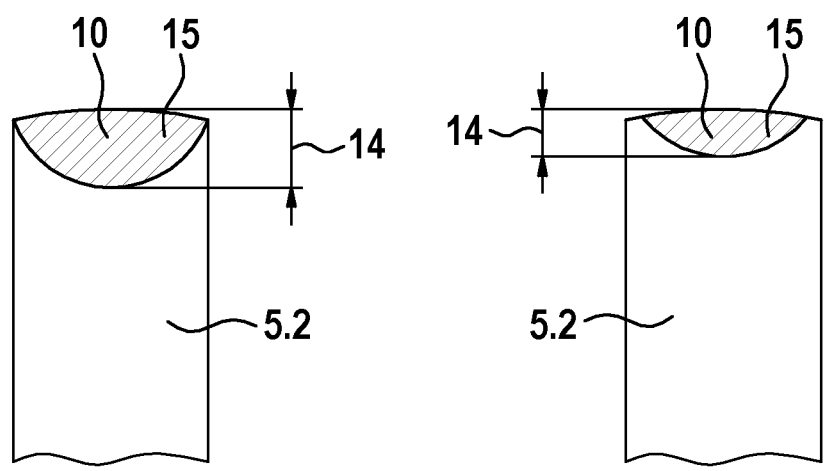

FIG. 4 shows a sectional view of a joining connection having greater strength for a conductor pair of FIG. 1 and FIG. 5 shows a sectional view of a joining connection having lesser strength for a conductor pair of FIG. 1.

A comparison of the joining connections of FIG. 4 with the joining connections of FIG. 5 makes it clear that the joining connections 10 having greater strength of FIG. 4 have a greater weld depth 14 and/or a greater weld seam width and/or a greater weld seam cross-section 15 than the joining connections of the other conductor pairs of FIG. 5.

According to one advantageous design, the weld seam cross-section 15 of the joining connections 10 of FIG. 5 (having the lesser strength) is 30% to 50% smaller than the weld seam cross-section 15 of the joining connections 10 of FIG. 4 (having the greater strength).

The invention claimed is:

1. A stator of an electric machine, the stator comprising stator slots (3) and comprising conductor elements (4) which extend through the stator slots (3) to form an electrical plug-in winding, wherein the conductor elements (4) project with conductor ends (5) from the stator slots (3) and form a winding head (6) on each of two end faces of the stator (1), wherein the conductor ends (5) of the conductor elements (4) each comprise a skewed portion (5.1) which extends in a peripheral direction and a joining portion (5.2) for contacting another of the conductor elements (4), wherein respective abutting joining portions (5.2) of two conductor elements (4) are joined by means of by a joining connection (10) and respectively form a conductor pair (11), wherein the conductor pairs (11) lie in the winding head (6) in a specific radial winding head position with respect to a stator axis (12), wherein the winding head position includes a winding head outer position (AL), a winding head inner position (IL) and intermediate winding head intermediate positions (ZL), wherein a conductor pair (11), which is disposed in the winding head outer position (AL) or in the winding head inner position (IL) and in which none of the skewed portions (5.1) are crossed with one of the skewed portions (5.1) of other conductor pairs (11) to form an interlacing (13), forms a free-standing conductor pair (FLP), wherein a conductor pair (11), which is disposed in the winding head outer position (AL) or in the winding head inner position (IL) and in which only one of the two skewed portions (5.1) is crossed with one of the skewed portions (5.1) of other conductor pairs (11) with mutual contact or support to form an interlacing (13), forms a one side-connected conductor pair (ELP), wherein the interlacing (13) is provided with mutual contact or support at a specific interlacing height (VH) relative to an end face of the stator (1), wherein a conductor pair (11), which is disposed in the winding head outer position (AL) or in the winding head inner position (IL) and the skewed portions (5.1) of which are crossed without contact to form an interlacing (13), form a contactlessly interlaced conductor pair (FLP), and wherein conductor pairs (11) are provided in the winding head (6), the joining connections (10) of the conductor pairs in the winding head having greater strength than the joining connection (10) of the other conductor pairs (11).

2. The stator according to claim 1, characterized in that the one side-connected conductor pairs (ELP), in which a ratio of the interlacing height (VH) to the height of the winding head (WH) is configured to be less than 0.5, and/or all free-standing conductor pairs (FLP) and/or all contactlessly interlaced conductor pairs (FLP) each comprise a joining connection (10) having greater strength.

3. The stator according to claim 1, characterized in that the weld seam cross-section (15) of the joining connections (10) having the lesser strength is 30% to 50% smaller than the weld seam cross-section (15) of the joining connections (10) having the greater strength.

4. The stator according to claim 1, characterized in that one of the two winding heads (6) is symmetrical and the other of the two winding heads (6) is asymmetrical, wherein the joining connections (10) having greater strength are provided in the asymmetrical winding head (6).

5. The stator according to claim 1, characterized in that the conductor elements (4) of the electrical plug-in winding are configured as an I-pin or as a hairpin.

6. A stator of an electric machine, the stator comprising stator slots (3) and comprising conductor elements (4) which extend through the stator slots (3) to form an electrical plug-in winding, wherein the conductor elements (4) project with conductor ends (5) from the stator slots (3) and form a winding head (6) on each of two end faces of the stator (1), wherein the conductor ends (5) of the conductor elements (4) each comprise a skewed portion (5.1) which extends in a peripheral direction and a joining portion (5.2) for contacting another of the conductor elements (4), wherein respective abutting joining portions (5.2) of two conductor elements (4) are welded to form a joining connection (10) and respectively form a conductor pair (11), wherein the conductor pairs (11) lie in the winding head (6) in a specific radial winding head position with respect to a stator axis (12), wherein the winding head position includes a winding head outer position (AL), a winding head inner position (IL) and intermediate winding head intermediate positions (ZL), wherein a conductor pair (11), which is disposed in the winding head outer position (AL) or in the winding head inner position (IL) and in which none of the skewed portions (5.1) are crossed with one of the skewed portions (5.1) of other conductor pairs (11) to form an interlacing (13), forms a free-standing conductor pair (FLP), wherein a conductor pair (11), which is disposed in the winding head outer position (AL) or in the winding head inner position (IL) and in which only one of the two skewed portions (5.1) is crossed with one of the skewed portions (5.1) of other conductor pairs (11) with mutual contact or support to form an interlacing (13), forms a one side-connected conductor pair (ELP), wherein the interlacing (13) is provided with mutual contact or support at a specific interlacing height (VH) relative to an end face of the stator (1), wherein a conductor pair (11), which is disposed in the winding head outer position (AL) or in the winding head inner position (IL) and the skewed portions (5.1) of which are crossed without contact to form an interlacing (13), form a contactlessly interlaced conductor pair (FLP), and wherein conductor pairs (11) are provided in the winding head (6), the joining connections (10) of the conductor pairs in the winding head having a greater weld depth (14), greater weld seam width or a greater weld seam cross-section (15), than the joining connection (10) of the other conductor pairs (11).

7. The stator according to claim 6, characterized in that the one side-connected conductor pairs (ELP), in which a ratio of the interlacing height (VH) to the height of the winding head (WH) is configured to be less than 0.5, and/or all free-standing conductor pairs (FLP) and/or all contactlessly interlaced conductor pairs (FLP) each comprise a joining connection (10) having greater strength.

8. The stator according to claim 6, characterized in that the weld seam cross-section (15) of the joining connections (10) having the lesser strength is 30% to 50% smaller than the weld seam cross-section (15) of the joining connections (10) having the greater strength.

9. The stator according to claim 6, characterized in that one of the two winding heads (6) is symmetrical and the other of the two winding heads (6) is asymmetrical, wherein the joining connections (10) having greater strength are provided in the asymmetrical winding head (6).

10. The stator according to claim 6, characterized in that the conductor elements (4) of the electrical plug-in winding are configured as an I-pin or as a hairpin.

11. The stator according to claim 6, characterized in that the joining connections (10) of the conductor pairs in the winding head having a greater weld depth (14) than the joining connection (10) of the other conductor pairs (11).

12. The stator according to claim 6, characterized in that the joining connections (10) of the conductor pairs in the winding head having a greater weld seam width than the joining connection (10) of the other conductor pairs (11).

13. The stator according to claim 6, characterized in that the joining connections (10) of the conductor pairs in the winding head having a greater weld seam cross-section (15) than the joining connection (10) of the other conductor pairs (11).

14. The stator according to claim 13, characterized in that the weld seam cross-section (15) of the joining connections (10) having the lesser strength is 30% to 50% smaller than the weld seam cross-section (15) of the joining connections (10) having the greater strength.

* * * * *